United States Patent [19]

Moorman et al.

[11] Patent Number: 4,951,561
[45] Date of Patent: Aug. 28, 1990

[54] APPARATUS FOR FLUID-SOLID BED PROCESSING

[75] Inventors: Charles T. Moorman, Harrington Park; Joseph L. Sabadics, Nutley, both of N.J.; T. Anthony Royal, San Luis, Obispo, Calif.

[73] Assignee: Kraft General Foods, Inc., Glenview, Ill.

[21] Appl. No.: 362,156

[22] Filed: Jun. 6, 1989

[51] Int. Cl.⁵ .......................... A23F 5/18; A23F 5/20; A23F 5/22
[52] U.S. Cl. ........................................ 99/471; 99/474; 99/483; 99/516; 34/73; 34/165; 422/242; 422/261
[58] Field of Search ................. 99/467, 471, 473–475, 99/483, 484, 485, 516, 534, 536, 289 R; 426/481, 387, 427, 422; 34/33, 165, 168, 73, 77; 422/198, 242, 261; 585/635; 414/288

[56] References Cited

U.S. PATENT DOCUMENTS

| | | | |
|---|---|---|---|
| 2,254,867 | 9/1941 | Bonotto | 34/27 |
| 2,555,052 | 5/1951 | Morse. | |
| 2,638,838 | 5/1953 | Talmey et al. | 99/471 X |
| 2,746,375 | 5/1956 | Abbott et al. | 99/471 |
| 4,060,394 | 11/1977 | Grebe et al. | |
| 4,062,654 | 12/1977 | Shigeyasu et al. | 422/242 |
| 4,096,792 | 6/1978 | Smith, Jr. | 99/471 |
| 4,246,291 | 1/1981 | Prasad et al. | 426/427 |
| 4,337,584 | 7/1982 | Johnson | 34/77 |
| 4,341,804 | 7/1982 | Prasad et al. | 426/387 |
| 4,348,422 | 9/1982 | Zosel | 426/427 |
| 4,416,859 | 11/1983 | Brown et al. | 422/261 |
| 4,816,275 | 3/1989 | Reich | 99/289 P |

*Primary Examiner*—Timothy F. Simone
*Attorney, Agent, or Firm*—Daniel J. Donovan; Thomas R. Savoie

[57] ABSTRACT

An apparatus for a supercritical fluid-solid bed process such as for decaffeinating green coffee beans including an elongated cylindrical vessel having a top and bottom. The solids accumulate to form a fluid-solids bed on the bottom of the vessel which includes a central bottom opening, a valve for periodically allowing flow of the solids through the bottom opening and a frustoconical bottom wall. A flow promoting insert having a lower conical wall is provided circumjacent to but spaced from the frustoconical bottom wall. The lower conical wall is provided with a rougher surface than the adjacent frustoconical bottom wall to promote uniform flow of solids. The fluid initially flows through the solids counter-current to the solid flow and is introduced to the vessell through means located above the flow promoting insert.

7 Claims, 1 Drawing Sheet

APPARATUS FOR FLUID-SOLID BED PROCESSING

FIELD OF THE INVENTION

The present invention relates generally to an apparatus for a fluid-solid bed process, and more particularly to an apparatus for decaffeinating green coffee beans which includes a flow promoting insert at the exit to a pressure vessel.

BACKGROUND OF THE INVENTION

In U.S. Pat. Application Ser. No. 166,748 filed Mar. 8, 1988, now U.S. Pat. No. 4,820,537, a method for decaffeinating coffee with a supercritical fluid is disclosed. This disclosed invention involves the continuous feeding of an essentially caffeine-free supercritical fluid to one end of an extraction vessel containing green coffee beans and continuously withdrawing a caffeine-laden supercritical fluid from the opposite end. A portion of the decaffeinated beans is periodically discharged while a fresh portion of undecaffeinated beans is essentially simultaneously charged to the extraction vessel. One suggested supercritical fluid is carbon dioxide.

In U.S. Pat. No. 2,555,052 (Morse), a chamber adapted for continuous flow of a granular substance therethrough is disclosed. The contacting vessel comprises an upper cylindrical section and a lower conical bottom having a hole at the apex of the cone for the discharge of the solid particles. A deflecting member comprising two regular and opposite cones having a common base is concentrically positioned in the chamber so that the common base lies in the plane formed by the intersection of the conical sides with the conical bottom.

In U.S. Pat. No. 4,060,394 (Orebe et al), a bottom closure for a chemical reactor is disclosed. This bottom closure is conically shaped and bears against a conical countersurface. The closure extends upwardly a sufficient distance into the center of the reactor to destroy solid bridges or arches during the opening of the closure.

SUMMARY OF THE INVENTION

In accordance with the present invention, an apparatus for a supercritical fluid-solid bed process, such as for decaffeinating green coffee beans, includes an elongated cylindrical pressure vessel which is vertically oriented. Solids are periodically introduced through a vessel top opening into the vessel to form a packed solids fluid bed in the vessel during operation. The vessel bottom includes a central bottom opening which is substantially smaller than the diameter of the cylindrical vessel and through which the decaffeinated solids flow. A valve means is also provided at the central bottom opening for periodically allowing the flow of solids and fluid through the central bottom opening. A frustoconical bottom wall extends downwardly and inwardly from the vessel to the bottom opening at a desired wall angle from vertical. A flow promoting insert is located in the vessel adjacent the frustoconical bottom wall. This insert includes a lower conical wall portion extending from a lower tip to a central base region and an upper tip portion that comprises a second conical wall extending upwardly and inwardly from the central base region to an upper tip. The wall angle of the lower conical wall is preferably substantially the same as that of the frusto- conical bottom wall. The insert is mounted adjacent the bottom wall with corresponding portions of the insert's lower conical wall parallel to but spaced from the vessel's bottom wall so that the insert promotes a uniformly level flow of the solids through the vessel and out through the bottom opening by restricting and regulating the flow of solids between these surfaces and by restraining the portion of the solids flow thereabove.

The dynamics of the system is such that the beans are allowed to descend into the space between the aforesaid insert and the bottom wall. The system is so operated as to permit as fast a plug flow of beans as practical to and through said aforesaid space. In this manner the downward flow of beans in the cylindrical section of the vessel is of a uniform velocity across the cross section of the vessel while beans therebelow move in such a manner as to assure aforesaid the uniform flow thereabove. The result is to give the bed of beans the same effect as a uniform shear stress across the bed of beans throughout the cylindrical section during flow and between the bean bed and the vessel wall. As a result, the objectives of the mass flow is afforded, i.e., the beans leave the vessel bottom in substantially the same order that they enter the top. This in turn means that all beans are in the vessel for a uniform time period to effect uniform decaffeination.

In a preferred embodiment of the present invention, the lower conical wall and upper conical wall of the insert have about the same wall angle from vertical. In addition, the upper tip of the insert is fixed by mounting means; the mounting means includes a plurality of locating and supporting plates spaced about the insert and extending between the frustoconical bottom wall and the upper conical insert wall.

In the preferred embodiment, the bottom opening includes a second converging frustoconical wall having a wall angle of about 7° from vertical. In addition, the lower half of the insert's conical wall has a rougher surface than the adjacent frustoconical bottom wall so that flow is promoted by the solids moving along the bottom wall.

A circulating means is provided for counter-current circulating of a fluid through the solids in the vessel. The circulating means includes an outlet within the vessel top and an inlet conducting means for conducting the fluid to the interior of the vessel from above the insert and through the beans to the top of the vessel. The pulsed-bed process includes periodic withdrawals and introductions of the solids such that the solids move in a plug flow in the active extraction region of the vessel.

In addition, the inlet conducting means includes a horizontal assemblage in the vessel from which the fluid issues. This assemblage is square or round, preferably square, and allows the fluid to be injected and move upwardly within the column. The assemblage is located broadly a minimum of ½ the radius of the column above the bottom of the cylinder portion of the column and it can be higher with similar effectiveness, say to a distance equal to a diameter of the column.

It is an advantage of the present invention that a plug flow (uniform mass flow) pattern is provided in the vessel and thus the solids move at an overall uniform rate down the column and do not appreciably intermix with solids higher or lower in the column and therefore extract uniformly. Mixing of the moving bed (to be minimized) would result in reducing the efficiency of the extraction by mixing solids of one solute content with solids of another solute content requiring longer extraction time for the same degree of solute removal.

It is also an advantage of the present invention that a large vessel is provided while at the same time minimizing the size of the valve means (such as a ball valve) which must be provided at the bottom outlet of the vessel. As the cost of such valve means for a high pressure process increases dramatically as the size of the opening increases, particularly the maintenance, minimizing of the valve size results in substantial capital and operating cost savings.

Other features and advantages of the present invention are stated in or apparent from a detailed description of a presently preferred embodiment of the invention found hereinbelow.

DETAILED DESCRIPTION OF THE PREFERRED EMBODIMENT

Figure 1:
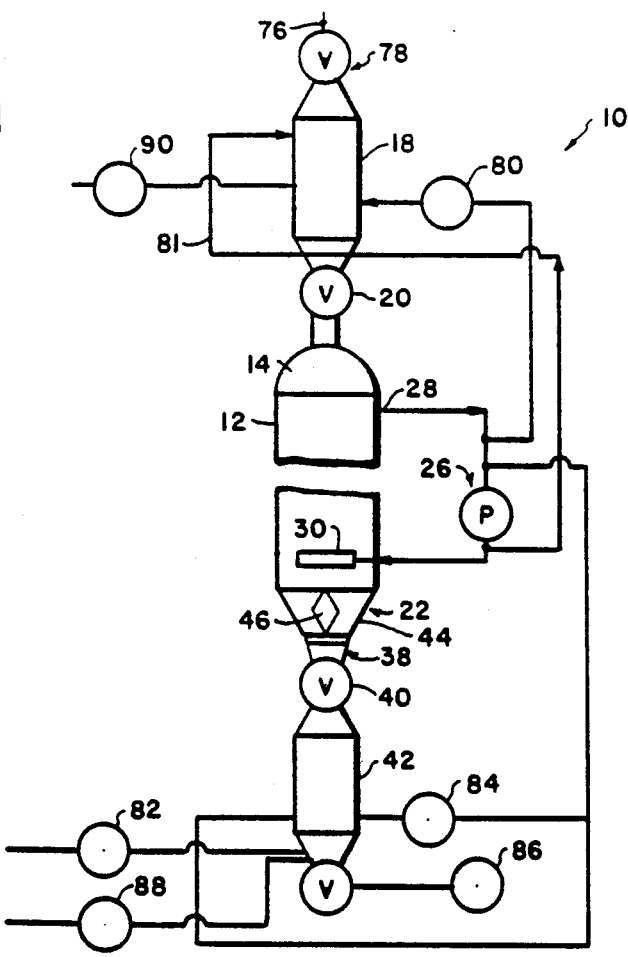
FIG. 1 is a schematic elevation view of the apparatus for fluid-solid coffee bed processing according to the present invention.

With reference now to the drawings in which like numerals represent like elements throughout the views, an apparatus 10 is depicted in FIG. 1 for a fluid-solid bed process. In the preferred embodiment, this fluid-solid bed process is used for the decaffeination of green coffee beans by use of a high pressure liquid or supercritical fluid such as carbon dioxide. Such a process is described in greater detail in the previously mentioned patent application and in a U.S. Pat. application Ser. No. 229,373, filed Aug. 5, 1988, by Jean Ellen Spence et al entitled "Method For Decaffeinating Coffee Materials Including A Reverse Osmosis Permeate Recycle", in U.S. Pat. application Ser. No. 229,369 also filed Aug. 5, 1988, by Michael O'Brien et al entitled "Caffeine Recovery From Supercritical Carbon Dioxide" and in a U.S. Pat. application Ser. No. 229,380, filed Aug. 5, 1988, by Saul A. Katz et al, entitled "Method for Decaffeinating Coffee with a Supercritical Fluid", all of which are herein incorporated by reference.

Apparatus 10 includes an elongated cylindrical vessel 12 which is vertically oriented. Vessel 12 includes a top 14 to which green coffee beans are inserted from a blow case 18 after passing through a valve means 20. The blow case 18 is simply a pressure vessel which can hold a portion of the volume of cylindrical vessel 12 and can feed the green coffee to the vessel 12 when extracted coffee is removed to blow case 42.

In vessel 12, green coffee beans are supplied periodically to form a bed. As schematically shown, a suitable high pressure or supercritical fluid such as carbon dioxide is circulated through the bed by a circulating means 26. The bed is packed from the bottom of the chamber generally, say at 22, to the top portion 14. Circulating means 26 includes an outlet 28 adjacent top 14 and an inlet conducting means 30 which conducts the fluid to the interior of vessel 12 above bottom 22.

Figure 3:
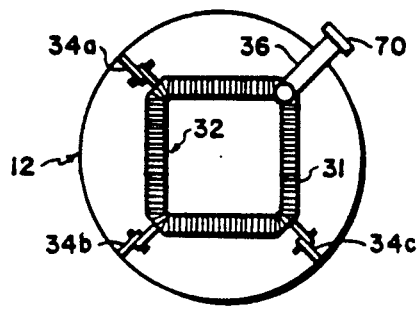
FIG. 3 is a top plan view of the fluid inlet conducting means depicted in FIG. 1.

Inlet conducting means 30 is preferably a horizontal assemblage 32 as shown in FIG. 3 having numerous cylindrical apertures feeding the supercritical fluid upwardly, apertures being in the form of a cylindrical slotted screen 31, the screen opening being 0.079" at their exterior. Assemblage 32 is held in place in vessel 12 by means of braces 34 a, b, c and a conducting pipe 36 through which the fluid flows into assembly 32.

Vessel bottom 22 includes a central bottom opening 38 which is substantially smaller in diameter than the diameter of cylindrical vessel 12. Below central bottom opening 38 is a valve means 40. Valve means 40 controls the movement of green coffee beans from vessel 12 to a blow case 42.

Figure 2:
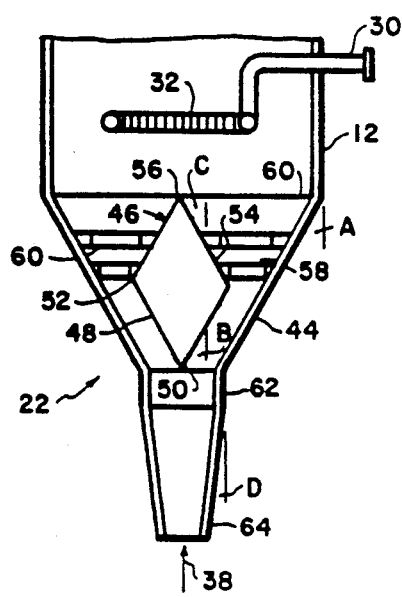
FIG. 2 is an enlarged cross-sectional view of the bottom portion of the apparatus depicted in FIG. 1.

As shown in greater detail in FIG. 2, vessel bottom 22 also includes a frustoconical bottom wall 44 extending downwardly and inwardly from the wall of vessel 12 to central bottom opening 38. Frustoconical bottom wall 44 is necessary because vessel 12 must have a large capacity in order to economically process green coffee beans. Thus vessel 12 is approximately 59 feet high and has an inside diameter of 6 ½ feet. The desired process requires a plug flow (uniform mass flow or horizontal plug) or pattern of movement of green coffee beans to and through vessel 12, so that valve means 20 and 40 are periodically opened to permit flow of beans to the bed and extracted beans from the bed. However, due to the high pressures maintained in vessel 12, 1,000 psi to 5,000 psi, in order to maintain the carbon dioxide in liquid or supercritical form, valve means 20 and 40 are subject to very high pressures. Because the cost of valves which can withstand such high pressures increases tremendously with the opening size, it is desired to maintain valve means 20 and 40 as small as practical. Thus, frustoconical bottom wall 44 is necessary to direct the flow of green coffee beans to central bottom opening 38 which is sized to receive the suitable valve means 40.

While frustoconical bottom wall 44 is thus highly desirous, the flow properties of green coffee beans 16 are such that the friction between beans and given wall materials can be quite high. ExPerimental data indicates that frustoconical bottom wall 44 without such an insert as 46 would have to be sloped at 7° or less from vertical in order to obtain mass flow for a wall of 304 stainless steel with a smooth 2B finish (a smoother dairy finish #4 to #7 gave similar results). A very steep frustoconical wall 44 is not practical due to the large capital and operating cost implications.

Therefore, apparatus 10 of the present invention includes a flow promoting insert 46 adjacent frustoconical bottom wall 44. As shown, insert 46 includes a lower conical wall 48 extending from a lower tip 50 to a central base region 52. Insert 46 also includes an upper conical wall 54 extending upwardly and inwardly from central base region 52 to an upper tip 56. A suitable mounting means such as plates or braces 58 and 60 (only four of eight are shown) extend from frustoconical bottom wall 44 to hold insert 46 in place in the center of frustoconical bottom wall 44.

In this preferred embodiment, frustoconical bottom wall 44 has a wall angle A of 21°. Lower conical wall 48 of insert 46 is designed so that corresponding portions of lower conical wall 48 are parallel to frustoconical bottom wall 44 and thus lower conical wall 48 also has a wall angle B of 21°. The wall angle C of upper conical wall 54 is preferably similar to the wall angle B of lower conical wall 48, and with this preferred embodiment is slightly less or about 19°.

While lower conical wall 48 does promote a steady flow along frustoconical bottom wall 44, there is still a tendency for flow to occur more easily along lower conical wall 48 than frustoconical bottom wall 44. Thus, to further even out the flow, lower conical wall 48 is made rougher than frustoconical wall 44. Thus, where frustoconical wall 44 has a number 2B finish, lower conical wall 48 is provided with a No. 1 finish.

In this preferred embodiment, the distance between lower conical wall 48 and frustoconical bottom wall 44 is preferably less than the valve 40 opening therebeneath or about six inches. Below lower tip 50, central bottom opening 38 includes a second frustoconical wall comprising a cylindrical portion 62 which is greater than the inside diameter of valve 40 or about 12 inches in diameter and a tapered portion 64 which tapers at an angle of 7° to an eight inch inside diameter at valve means 40.

To achieve the desired mass flow, the walls of vessel 12 must be sufficiently smooth and steep to cause coffee to flow therealong. In particular, surface finish is most critical at frustoconical bottom wall 44.

Referring in particular to FIGS. 2 and 3, the liquid carbon dioxide is fed through pipe 36 to a manifold 32 mounted at 34 a,b,c, above the frustoconial insert 46 at the lower reaches the cylindrical vessel 12. The fluid carbon dioxide feeds through manifold 32 generally in a upward direction in the vessel 12, the holes for manifold 32 being approximately a distance above the lowermost cylindrical point of vessel 12 equal to the radius of the vessel.

Caffeinated beans enter the apparatus at 76, passing through ball valve 78 and filling blowcase 18, blowcase 18 having previously been emptied of carbon dioxide through valve means 90. After the vessel 18 is full of beans, the valve 78 is closed and fluid carbon dioxide is charged through valve means 80, valve 20 being closed until a pressure level equal to that in extractor 12 is reached in blowcase 18, said pressure being say 4500 psi. Simultaneously, a valve means 82 opens and vessel 42 is pressurized to 4500 psi.

Valves 20 and 40 are opened simultaneously. Each time blow case 18 is fully charged with beans, blow case 42 is empty of beans. Thereupon, the beans drop through the cylindrical vessel 12 a minor length, typically 10% of the total bean charge to the vessel. Simultaneously, fully decaffeinated beans are discharged to blow case 42, valve means 86 being closed.

Upon passage of approximately four minutes for each fill cycle of fresh beans, the measured charge will again fully reload chamber 12 for continued countercurrent fluid-solid extraction. The charge of decaffeinated beans is covered by opening valve 86 for discharge after fluid carbon dioxide has been removed from blow case 42 through valve 88.

Succeeding repetitive pulse cycles as above, move the beans downward uniformly through chamber 12, creating a semi-continuous (pulsed) beans flow which is countercurrent to the essentially continuous upward fluid carbon dioxide flow in chamber 12. The drop of beans from blow cases 18 and 42 is enhanced by injection of fluid carbon dioxide respectively through 81 and by separately withdrawing fluid carbon dioxide at 84.

Decaffeination in chamber 12 continues for say 10 to 120 minutes, and more commonly 30 minutes, during which the static bed is contacted by fluid carbon dioxide and caffeine is extracted from the beans. Hence, a cycle will be repeated, say 10 times, from the time of introduction of the green beans to discharge of a fully decaffeinated bean. Fluid carbon dioxide, at approximately 4500 psi, is charged by pump 26 through inlet conducting means 30.

Part of the fluid carbon dioxide feed passes upwardly as stated herein and part moves downwardly through the apparatus 10 in the direction of bottom wall 44 and through valve 40 along with beans, the carbon dioxide fluid serving to move the beans during the bean pulse cycle. In this connection, during the bean pulse cycle the carbon dioxide fluid is discharged through valve means 84 which in turn returns directly to circulation means 26.

Repetitive cycles are continued so that the system maintains a semi-continuous flow of caffeinated and decaffeinated coffee beans and fluid carbon dioxide is availed fullY at the stated pressure. It is possible to decaffeinate a pulsed charge of say 6500 pounds of coffee in 4.5 to 6 hours, depending upon bean variety to a point having at least 97% caffeine removed. The operation may be continued indefinitely. The apparatus fully decaffeinates all of the beans to the same degree. The apparatus conserves the weight and size and the corresponding cost. Column length and mass is thus significantly reduced, the overall objective of this invention.

While the present invention has been described with respect to an exemplary embodiment thereof, it will be understood by those of ordinary skill in the art that variations and modifications can be effected within the scope and spirit of the invention.

What is claimed is:

1. An apparatus for an extracting supercritical fluid-solid bed process comprising:
   an elongated cylindrical vessel which is vertically oriented;
   a vessel top through which the solids are introduced into said vessel;
   a vessel bottom upon which the solids accumulate to form a fluid-solids bed in said vessel, said vessel bottom including (a) a central bottom opening substantially smaller than the diameter of said cylindrical vessel and through which the solids can flow, (b) a valve means at said central bottom opening for controlling the flow of the solids through said central bottom opening, and (c) a frustoconical bottom wall portion extending downwardly and inwardly from said vessel to said bottom opening and having a wall angle from vertical;
   a flow promoting insert having a lower conical wall extending from a lower tip to a central base region and having a wall angle from vertical substantially the same as the wall angle of said bottom wall;
   means for mounting said insert adjacent to but parallel and spaced from said bottom wall whereby said insert promotes an even flow of the solids through said vessel and out through said bottom opening;
   and a circulating means for countercurrent circulation of a supercritical fluid through the solids in said vessel, said circulating means including an outlet adjacent said vessel top and an inlet for conducting the fluid to the interior of said vessel above said insert.

2. A fluid-solids bed apparatus as claimed in claim 1 wherein said insert has an upper tip portion that comprises a second conical wall extending upwardly and inwardly from the extremity of the lower conical wall.

3. A fluid-solids bed apparatus as claimed in claim 1 wherein said mounting means includes a plurality of locating plates spaced about said insert and extending between said frustoconical bottom wall and the insert.

4. A fluid-solids bed apparatus as claimed in claim 1 wherein said lower conical wall portion has a rougher surface than the adjacent bottom wall to promote uniform flow of the solids therebetween.

5. A fluid-solids bed apparatus as claimed in claim 1 adapted to effect withdrawals and introduction of the solids at approximately the same rate.

6. An apparatus for decaffeinating green coffee beans comprising:

an elongated cylindrical pressure vessel which is vertically oriented;

a charging means for periodically charging green coffee beans into a top of said vessel, said charging means including a blow case, a conduit from said blow case to the top of said vessel, and a first valve means in said conduit for controlling the flow of coffee beans from said blow case to said vessel;

a vessel bottom upon which the green beans accumulate to form a supercritical fluid-solids bed in said vessel, said vessel bottom including (a) a central bottom opening substantially smaller than the diameter of said cylindrical vessel and through which the green beans can flow, (b) a second valve means at said central bottom opening for periodically allowing the flow of the green beans through said central bottom opening, and (c) a frustoconical bottom wall extending downwardly and inwardly from said vessel to said bottom opening and having a wall angle from vertical;

a flow promoting insert having a lower conical wall extending from a lower tip to a central base region and having a wall angle from vertical substantially the same as the wall angle of said bottom wall;

a mounting means for mounting said insert adjacent but spaced from said bottom wall ; and a circulating means for circulating carbon dioxide fluid from above said insert to the top of said vessel to remove caffeine from green beans as the green beans move downwardly through said vessel.

7. An apparatus for decaffeinating as claimed in claim 6 wherein said lower conical wall has a rougher surface than the adjacent frustroconical bottom wall to promote even flow of the solids along the bottom wall.

* * * * *